United States Patent [19]  [11] 4,449,967
Caldwell  [45] May 22, 1984

[54] CONVEYOR FLIGHT CONFIGURATION
[75] Inventor: John W. Caldwell, Glenside, Pa.
[73] Assignee: Pennwalt Corporation, Philadelphia, Pa.
[21] Appl. No.: 389,313
[22] Filed: Jun. 17, 1982
[51] Int. Cl.³ .............................................. B04B 3/04
[52] U.S. Cl. .......................................... 494/54; 494/55
[58] Field of Search ........................ 494/50, 52, 53, 54, 494/55; 198/676; 366/318, 319, 320

[56] References Cited
U.S. PATENT DOCUMENTS
3,764,062 10/1973 Brautigam .............................. 494/55
4,328,925 5/1982 Shapiro .................................. 494/55

FOREIGN PATENT DOCUMENTS
347084 8/1970 U.S.S.R. .................................. 494/54

Primary Examiner—Robert W. Jenkins

[57] ABSTRACT

The blade of a helical screw conveyor of centrifuge apparatus is improved to reduce the amount of torque required in operating the apparatus as well as to produce discharged solids drier than the solids discharged using a conventional blade; the improvement provides that the distal end of the leading surface of the blade at or adjacent at least the trunco-conical end of the centrifuge bowl have a generally arcuate configuration concave in the direction of the solids discharge port such that the more distal blade portions peel the separated solids material from the bowl wall with minimum torque requirements, while the less distal arcuate portions tumble the solids to reduce the moisture content. Typically, the blade's arcuate leading surface is formed by add-on, wear-resistant members attached to a backing plate which in turn is mounted on the leading surface of the blade.

13 Claims, 9 Drawing Figures

CONVEYOR FLIGHT CONFIGURATION

CROSS-REFERENCE TO PENDING APPLICATIONS

Reference is hereby made to copending patent applications of L. Shapiro for "Hard Surfacing Decanter Conveyors", Ser. No. 877,056, filed Feb. 13, 1978, and a continuation-in-part thereof for "Hard-Surfacing for a Centrifuge Conveyor", Ser. No. 136,123, filed Mar. 31, 1980, now U.S. Pat. No. 4,328,925, granted May 11, 1982, both assigned to the assignee hereof.

STATEMENT OF THE INVENTION

This invention relates to a screw conveyor for centrifuge apparatus, and more particularly to an improved screw conveyor having an arcuate surface of defined curvature upon the leading surface of its helical blade or blades adjacent the distal edge thereof. This invention provides reduced torque in driving the conveyor and a reduced moisture content of discharged solids over that available under the same conditions using a substantially flat conveying surface.

BACKGROUND AND SUMMARY OF THE INVENTION

Scroll or screw conveyor centrifuge decanters are well known. Typically such apparatus comprises an elongated bowl mounted for rotation about the longitudinal axis with a helical screw conveyor, coaxially mounted within the bowl, adapted to rotate at a speed slightly different than the speed of rotation of the bowl; the bowl is tapered or trunco-conical at its solids discharge end. The screw conveyor is formed of one or more helically arranged blades, which may be mounted on a hub or spider and disposed to sweep the surface of the bowl of the apparatus while propelling the centrifugally separated solids toward the solids discharge port. An example of such equipment in which the blade is helically mounted on a hub is described in U.S. Pat. No. 3,764,062, incorporated herein by reference.

In the operation of a screw conveyor centrifuge, a solids-liquids feed is introduced into the bowl, where, due to centrifugal force effected by rotation of the bowl, the feed separates into its component parts with the heavier solids being moved outboard of the liquids and adjacent to the bowl's inner surface. Since the bowl and screw conveyor are rotated at controlled different speeds, solids sedimented against the bowl inner surface are conveyed by the conveyor's blade along the bowl's annular surface until discharged from one or more ports at the trunco-conical end of the bowl.

The present invention provides that in screw conveyor, centrifugal apparatus for the continuous separation of solids/liquids mixtures, the leading surface of the conveyor blade adjacent to its distal edge is provided with an arcuate surface of defined curvature and slope. Such arcuate surface is that portion of the blade adapted to contact the solids upon separation, at least within the trunco-conical portion of the bowl. The arcuate surface is concave in the direction of the solids discharge port and has a profile in a plane through the axis of rotation of the blade whereby (i) a line disposed in the plane and perpendicular to the bowl surface and a straight line tangent to the slope of the profile adjacent the distal edge define an angle α of between 10° and 70° subtended within the concavity (ii) the straight line tangent to the slope of the profile most distant from the distal edge (on the opposite side of the cavity) defines an angle β between about 7° and 90° subtended within the concavity with a line disposed in the plane and perpendicular to the axis. The arcuate surface, in use, propels the separated solids toward the solids discharge port, while tumbling them, due partly to the curvature of the surface and partly to the rotation of the bowl and the blade at a speed differential.

DETAILED DESCRIPTION OF THE INVENTION

The Working Surface Defined

Figure 1:
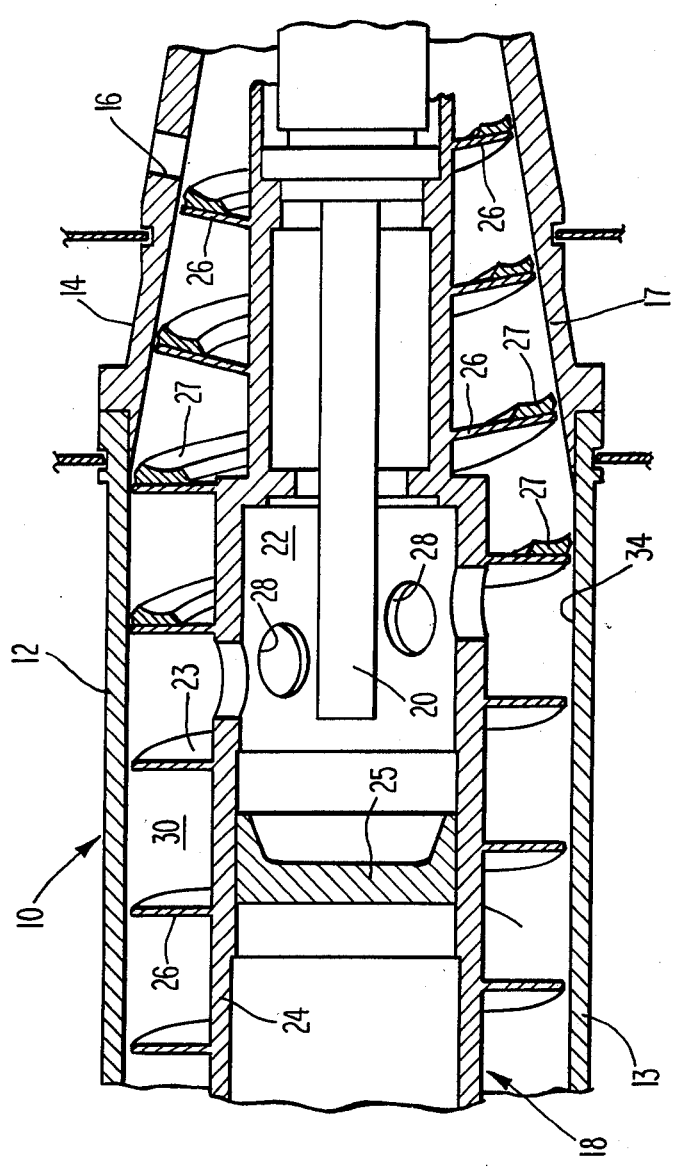
FIG. 1 is a fragmentary, longitudinal sectional view of a centrifuge, taken through the rotational axis of the centrifuge, embodying the present invention.

Referring to FIG. 1, centrifuge apparatus 10 comprises an axially elongated bowl 12 of annular cross-section which receives the solids-liquid mixture. Bowl 12 is adapted for rotation about a longitudinal axis. In addition to a main portion 13 of generally cylindrical shape, bowl 12 includes a tapered or convergent end portion 14 of generally trunco-conical form. The inner surface 34 of end portion 14 of bowl 12 gradually decreases in diameter towards a solids discharge port 16, the inner surface 34 of the bowl thus providing a drying "beach" 17 for solids moving toward port 16 and out of the liquid pool, or pond, (not shown) created by the centrifugal action when apparatus 10 is in use.

Coaxially mounted within bowl 12 is a helical screw conveyor 18, consisting of a hub 24 on which is mounted a blade 26. The blade is helically formed, and has a plurality of turns or flights, for example flights 26A, 26A' and 26'' in the embodiment of FIG. 2. Conveyor 18 is rotatably mounted on a common axis with bowl 12 and is adapted to be driven at a speed slightly different from that of bowl 12, as a result of which the solids are conveyed in axial direction by contact with the leading surface of blade 26.

The solids-liquid mixture is delivered as feed to the interior of centrifuge 10 through a stationary feed tube 20. Tube 20 projects in an axial direction and terminates concentrically of a feed chamber 22 defined by the interior of hub 24 and target 25. Feed introduced into feed chamber 22 exits radially therefrom through feed passage 28 into separation chamber 30 disposed between the outer surface of hub 24 and the inner surface of bowl 12. Effluent is discharged through liquid discharge openings (not shown).

The outwardly projecting, helically formed blade 26 has a leading surface 23 facing in the direction of discharge port 16. The distal edge of blade 26 is shaped to conform to the inner surface 34 of bowl 12 such that, upon rotation of conveyor 18, the distal edge of blade 26 is closely spaced to inner surface 34 and in sweeping relationship thereto. In operation, that part of leading surface 23 of blade 26 that is contiguous to the most distal portion of blade 26 provides a working surface 27 which contacts the solids separating from the feed due to the combined centrifugal force and the relative rotational movements of conveyor 18 and bowl 12.

Shape of the Profile

The arcuate shape or curve of the profile of working surface 27 is the crux of the present invention. The shape and disposition of the curvature is readily apparent in FIG. 2, the cavity or throat T of the profile curve facing discharge port 16. It is essential for purposes of the present invention that that section of the profile of working surface 27 taken cross-sectionally through the axis, adjacent the more distal end of surface 27, protrude in the direction of solids discharge port 16 to provide surface 27 with a relatively shallow "approach angle" with the inner surface of bowl 12, and that the end of the cross-sectional profile of working surface 27 most distant from the distal edge protrude at an angle sufficient to provide tumbling action upon solids engaging the working surface 27 while conveyor 18 is rotating. Thus, the more distal portions of surface 27 may be considered to be a solids propelling surface and the less distal portion thereof may be considered to be a solids tumbling surface.

Figure 2:
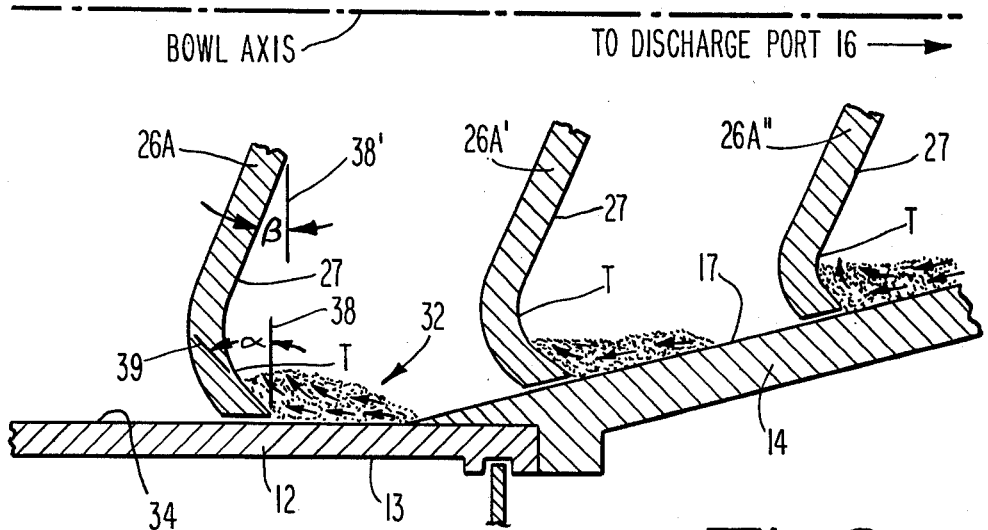
FIG. 2 is a sectional view, taken through the rotational axis of the centrifuge, illustrating a fragment of the bowl and also a blade embodying the present invention.

Angle $\alpha$, as shown in FIG. 2, is that angle in an axial plane and subtended within the concavity between a line 38 drawn perpendicular to inner surface 34, and tangent 39 to the curve of conveying surface 27 at the extremity of the outboard protrusion. The term "axial plane", as used herein, refers to a plane passing through the longitudinal or rotational axis of the bowl 12 and the conveyor 18. Angle $\beta$, also shown in FIG. 2, is that angle in an axial plane and subtended within the concavity defined by line 38', drawn perpendicular from the axis of rotation of conveyor 18, and tangent 39' to the curve of working surface 27 at the extremity of the less distal portion thereof. Use of an angle $\alpha$ of 45° is preferred, although angles $\alpha$ ranging from about 10° to about 70° are useful; angle $\beta$ may range from about 7° to almost 90°. The angle $\alpha$ at the extremity of the most distal portion is responsible for the peeling of the solids material 32 from inner bowl surface 34 and allows the cake or solids material to slide up arcuate working surface 27. If angle $\alpha$ is less than about 10°, the peeling action produced by working surface 27 is not appreciable. If angle $\alpha$ exceeds about 70°, the extremity of the most distal protrusion may be structurally weak.

The shape of the cross-sectional profile of the curve produced by working surface 27 may vary widely. A simple curvilinear shape is adequate but other shapes such as horse-shoe, lancet, ogee, basket-handle or the like (as these terms are used to describe an arch) are also useful. Although a working surface 27 with a smooth throat section is preferred, profiles having one or more sharp angles in the throat may for some feedstocks provide improved performance over flat working surfaces and are comprehended within the spirit of the present invention. It also will be obvious to those skilled in the art that the overall dimensions as well as the profile shape of working surface 27 may be adjusted to accommodate the dimensions of blade 26 and the kind of solids being separated.

The relative dimensions of the profile components may vary widely. Furthermore, working surface 27 may be provided on the entire length of blade 26 (measured along the length of conveyor hub 19) or part of such length, as for instance, only along beach 17. Furthermore, the configuration of the working surface profile may vary along the length of blade 26. Use of a working surface 27 whose cross-sectional profile provides the arcuate configurations at least in the area of the beach area 17 has been found particularly useful for feedstocks containing relatively dense particulate matter; however, for many applications, the arcuate configuration profile may be used advantageously in the cylindrical section of the bowl as well.

Action of The Working Surface

Figure 3:
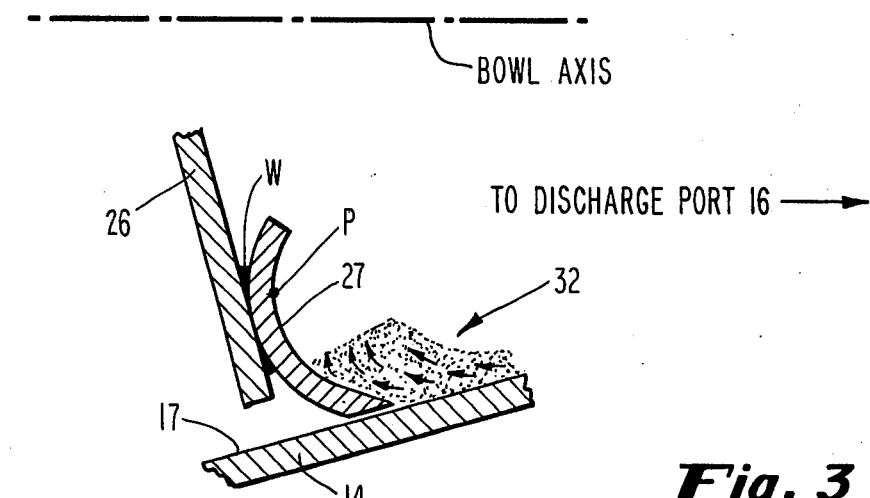
FIGS. 3 and 4 are sectional views of other embodiments of blades according to the present invention, taken through the rotational axis of the centrifuge, and illustrating by arrows the path of solids material movement at different intervals of conveying.
Figure 4:
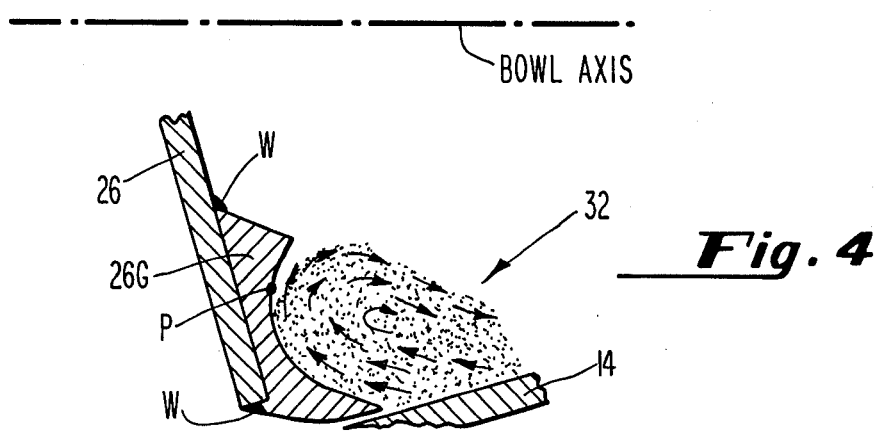

Referring particularly to FIG. 2, the working surface 27 of blade 26 at flights 26A, 26A' and 26A", permits the separated solids 32 to be collected with additional build-up at each flight. The amount of solids 32 being conveyed at any one flight will determine whether solids 32 buckles back upon itself during motion toward port 16 or tumbles over upon itself, as shown in FIGS. 3 and 4. Thus, referring now to FIG. 3, when the thickness of layer of solids 32 is not sufficient to reach radially inwardly to point P, solids 32 when in motion largely buckle back upon themselves (in the direction of the small arrows); on the other hand when the layer of solids 32 is sufficient to exceed point P, as illustrated in FIG. 4, a tumbling action, again in the direction of the small arrows, is experienced along working surface 27. In either event, considerably less torque is required to move solids 32 as compared with a conveyor separating the same feedstock components but employing conventional blades in which angle $\alpha$ is 0°. The working surface 27 of the present invention continuously peels the solids from bowl inner surface 34, permitting solids 32 to slide along the curved surface of working surface 27 as opposed to merely pushing the solids, which characterizes the movement incident to the use of conventional blades. In general, it has been found that, in operation, torque requirements can be reduced for a given feedstock about 30% when the improved blade configuration of the present invention is employed compared with such requirements using conventional blades.

Where tumbling action is induced upon solids 32, the cake of solids redistributes itself ahead of moving blade 26 thereby releasing trapped liquid and providing more complete separation of the liquid from the solids material. A drier solids cake results. In tests conducted using the various improved working surfaces described herein, as much as a 28% reduction in moisture content was achieved, i.e., from about 14% moisture content using standard or conventional blades to about 10%. The reason for the improved moisture content may be ascribed to the constant breaking up of the substantially impervious "fines" layer during the continuous tumbling action. Thus, in prior art apparatus, while the coarser grains of material travel or migrate outwardly toward the bowl wall due to centrifugal force effected by rotation of the bowl, the finer grains, capable of retaining more interstitial moisture than the coarser grains, remain inwardly of the coarser grains. However, in the operation of apparatus of the present invention the solids cake is tumbled continuously and the fines are constantly redistributed throughout the cake to promote release of retained moisture.

Figures 5, 6:
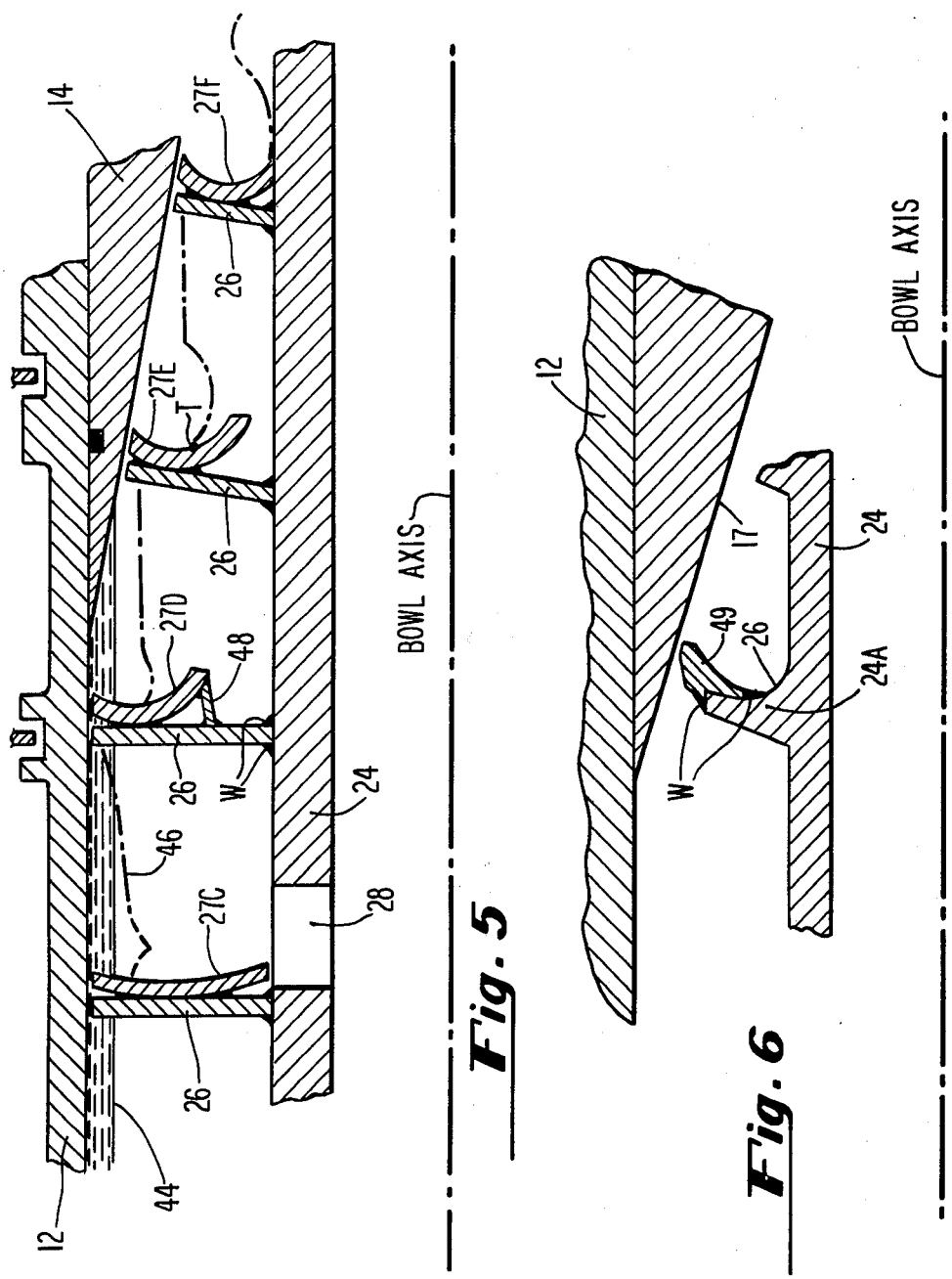
FIG. 5 is a fragmentary sectional view of a centrifuge screw conveyor, taken through its rotational axis and illustrating further embodiments of the present invention.
FIG. 6 is a fragmentary sectional view of a screw conveyor, taken through its rotational axis illustrating another variation of blade configuration embodying the invention.

FIG. 5 illustrates part of a screw conveyor centrifuge in operation. In this figure the liquid inner surface in FIG. 5 is designated 44 and the solids layer inner surface shown by a broken line designated 46. It will be noted that the amount of solids builds up in successive flights and that conditions to provide tumbling action occur as the solids reach the beach area 14. The figure also demonstrates a variation in the profile of working surface 27 in successive flights.

Construction Variations

The mechanics of providing working surface 27 upon blade 26 can vary widely. Each of the FIGS. 1 through 9 illustrates a suitable variation. Except for the use of "curved" blades 26 in FIG. 2, each embodiment provides that working surface 27 be an "add-on" to blade 26. The attachment is conveniently made by a weldment, W, although other means of attachment may be used. The method of attachment of working surface 27 to blade 26 can vary from flight to flight as shown in FIG. 5 and can include members 48 as there illustrated. On the other hand, curvatures in blade 26 can cooperate with add-on structures to form a suitably shaped working surface as shown in FIG. 6, where blade 26 integral with hub 24 has secured thereto, typically by weldments W, member 49 to form a working surface of suitable profile.

Figure 7:
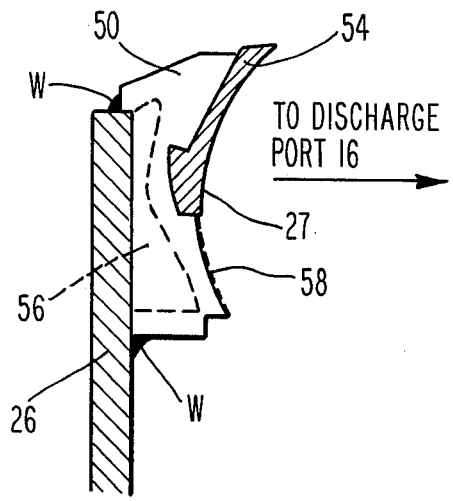
FIGS. 7, and 8, and 9 are additional views of blade configurations, partially sectioned for clarity of illustration, taken through the rotational axis of the centrifuge, embodying the present invention, the surfaces having been formed using add-on wear-resistant members.

In FIG. 7, backing plate 50, typically stainless steel, is secured to blade 26 by means of weldments W as described in U.S. Pat. Nos. 3,764,062 and 4,328,925, both of which are assigned to the assignee of the present application. Wear-resistant member 54 is disposed along the outboard portion of working surface 27 in dovetail relationship to backing plate 50 which is provided with a hollow portion 56 for weight reduction. A hardened surface 58 is applied to the inboard portion of working surface 27, also as described in the aforesaid patents.

Figure 8:
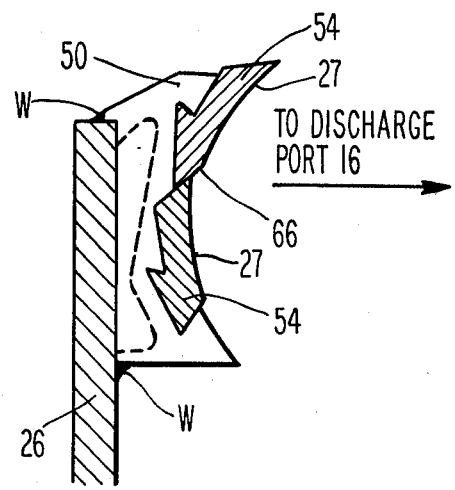

In FIG. 8, backing plate 50 supports two wear-resistant members 54 in dovetailing relationship and provides a receding step 66 such that solids flowing along the working surface 27 of members will not be dammed therebetween upon increased wear of surface 27 of the more distal member. Backing plate 50 is provided with a hollow 56 for weight reduction.

Figure 9:
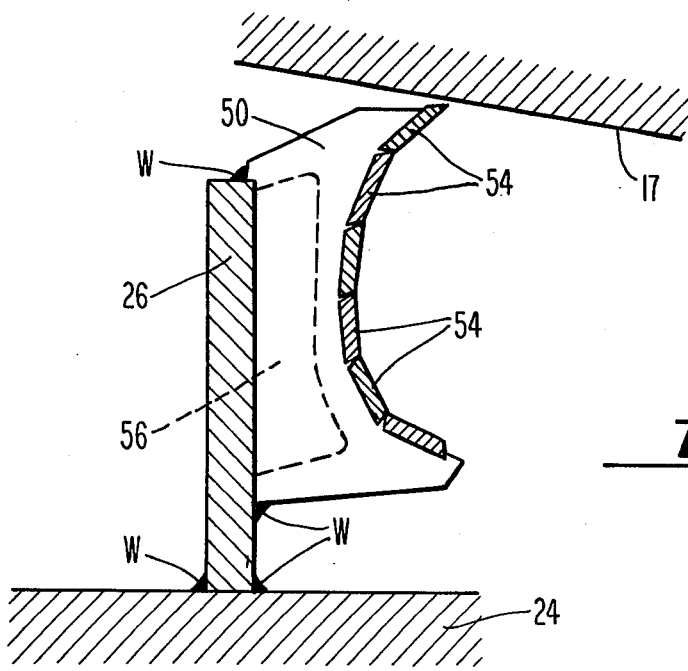

In FIG. 9, backing plate 50 supports a plurality of wear-resistant members 54, preferably brazed thereto in accordance with U.S. Pat. No. 3,764,062, although the members may be secured to plate 50 by any suitable means. Backing plate 50 is again provided with a hollow 56.

Materials of Construction

The identity of the material of which conveying surface 27 is constructed is not critical to the present invention but will obviously be important for the long term maintenance and operation of the equipment when the solids in the feed are of an abrasive character. As illustrated in FIG. 2, blades 26A, 26A' and 26" which are normally constructed of hardened steel may be shaped to form the curvilinear profile required for the present invention, without the use of any surfacing material. Nevertheless, as discussed above, it is generally preferred to apply a distinct shaped surface component to blade 26. Thus, FIGS. 3, 4 and 5 illustrate structures in which a suitably curved strip of hardened metal forms working surface 27, being secured by welds W to blades 26; in FIGS. 7, 8 and 9 the use of a radial array of hardened, replaceable titles mounted on the blade 26 to form a wear-resistant working surface 27 is illustrated.

Advantages

Several benefits result from a reduction in torque requirement for a given quantity of solids material being conveyed. In addition to a smaller amount of power being needed to drive the centrifuge, the forces and wear on the gearbox assembly usually used to drive the conveyor from the bowl will be lessened. Since the torque capacity of the gearbox limits the quantity of solids material which can be conveyed along the beach, the working surface of the present invention allows the centrifuge to convey a large quantity of solids using a gearbox of relatively low capacity. Furthermore, when the moisture content in the solids material is reduced, the cost of transporting and drying the material is also reduced. In addition, when the discharged solids material is burned for disposal and/or to utilize its heat of combustion, as with coal, for example, less heat is required to vaporize the moisture from the solids, resulting in a net increase in the heat of combustion.

It is apparent from the foregoing description that I have provided centrifuge apparatus having an improved working surface configuration which markedly reduces the torque required while substantially improving the efficiency of moisture removal from the solids material. The exact details of structure for the working surface configurations are not intended to be limiting, for obvious modifications thereof will be apparent to persons skilled in the art.

I claim:

1. Apparatus for the continuous separation of solids/liquids mixtures into separate components by centrifugal action comprising an elongated bowl having an inner bowl surface, and including a cylindrical portion adapted to receive said solids/liquids mixtures and a trunco-conical portion having a discharge port adapted to the discharge of solids separated from said mixture, said bowl being mounted for rotation about its longitudinal axis and conveying means including at least one blade having a leading surface facing in the direction of said port and a distal edge, said blade being helically and coaxially mounted within said bowl through the length of said bowl surface with the distal edge of said blade in a closely spaced, sweeping relationship to said bowl surface and means for rotating said bowl and said blade at a speed differential, the improvement which comprises providing along said leading surface of said blade and adjacent said distal edge thereof at least within part of said trunco-conical portion an arcuate surface portion of defined curvature and shape adapted to contact said solids after separation, said arcuate surface portion being defined by a concavity in said leading surface, said curvature of said arcuate surface having a profile defined in a plane through said axis whereby (i) a straight, first line tangent to the slope of said profile adjacent said distal edge and a second line disposed in said plane and perpendicular to said bowl surface subtend an angle $\alpha$ within said concavity of between about 10° and 70° and (ii) a straight, third line tangent to the slope of said profile most distant from said distal edge and a fourth line disposed in said plane and perpendicular to said axis, subtends an angle $\beta$ within said concavity of between about 7° and 90°, said arcuate surface portion, in use, propelling and tumbling separated solids towards said solids discharge port during rotation of said bowl and said blade at said speed differential.

2. Apparatus of claim 1 wherein said arcuate surface portion extends from said trunco-conical portion of said bowl at least partially into said cylindrical portion of said bowl.

3. Apparatus of claim 1 wherein said arcuate surface portion is provided by securing an add-on, wear-resistant member to said blade.

4. Apparatus of claim 1 wherein said arcuate surface portion comprises a radial array of add-on, wear-resistant members mounted on said blade.

5. Apparatus of claim 1 wherein said blade, mounted along its length to a hub, provides a conveyor coaxially mounted within said bowl.

6. Apparatus of claim 1 wherein the curvature of the leading surface of said blade, as defined by the profile of said arcuate surface portion, varies along said blade.

7. The apparatus of claim 1 wherein said arcuate surface portion extends substantially along the entire length of said inner bowl surface.

8. The apparatus of claim 7 wherein said angle $\alpha$ is about 40° and said angle $\beta$ is about 50°.

9. The apparatus of claim 7 wherein angle $\alpha$ varies from 10° to 50° along the length of said surface and angle $\beta$ varies from 7° to 75°.

10. The apparatus of claim 1 wherein said arcuate surface portion is restricted substantially to said trunco-conical portion of said inner bowl surface.

11. The apparatus of claim 10 wherein said angle $\alpha$ is about 40° and said angle $\beta$ is about 50°.

12. The apparatus of claim 10 wherein said angle $\alpha$ varies from 10° to 50° along its length and angle $\beta$ varies from 7° to 75°.

13. The apparatus of claim 1 wherein said arcuate surface portion is provided in part by appropriate curvature to said blade and in part by an add-on member of shape suitable to provide said arcuate surface.

* * * * *